Patented Aug. 29, 1939

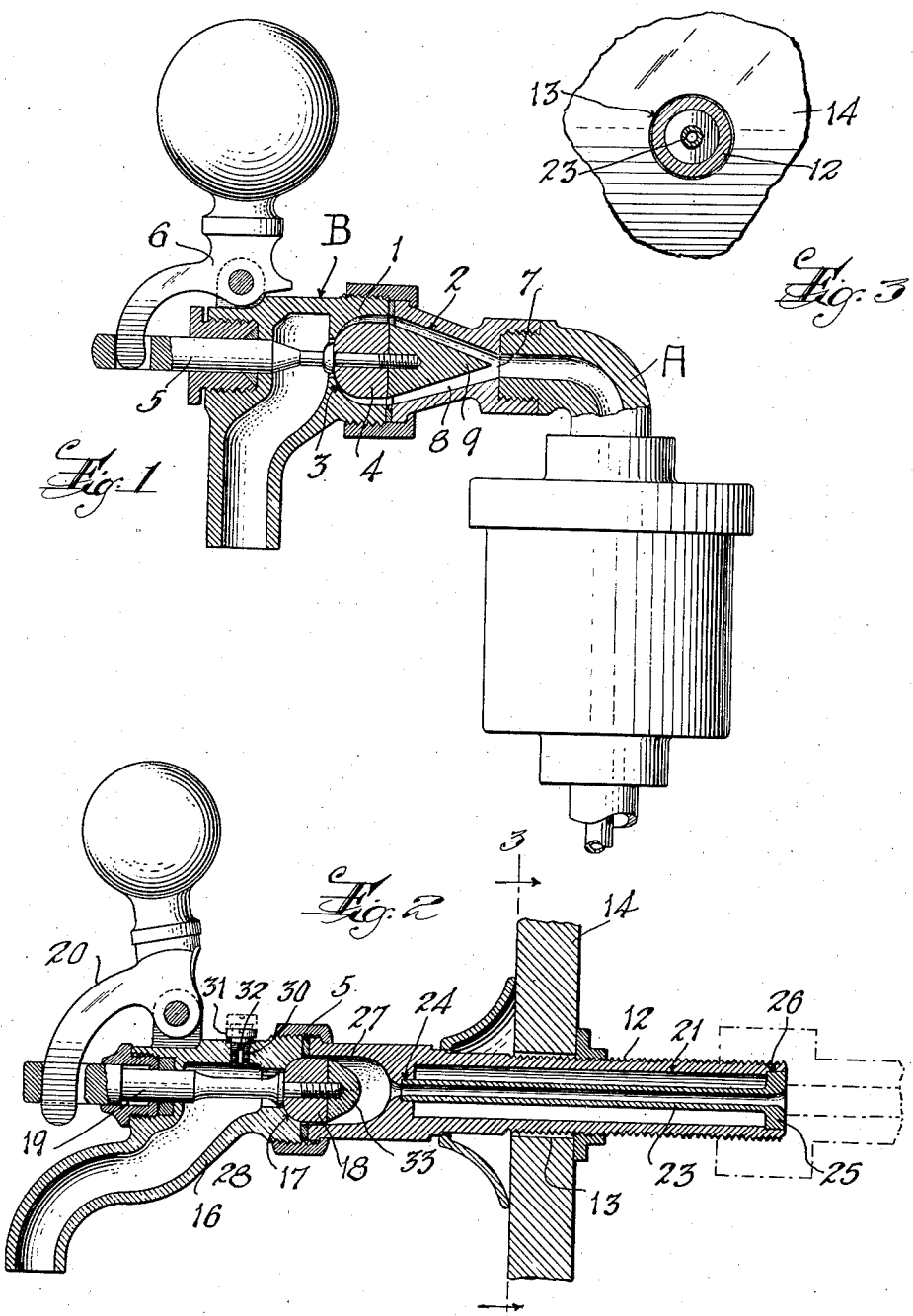

2,170,922

UNITED STATES PATENT OFFICE 2,170,922

BEER-DISPENSING FAUCET

Herman H. Harr, Newark, N. J.

Application November 18, 1935, Serial No. 50,259

9 Claims. (Cl. 225—5)

This application is a continuation in part of my Patent No. 2,021,305 issued Nov. 19, 1935, and relates particularly to a faucet to be used in connection with beer dispensing apparatus described and claimed in that application.

The above mentioned apparatus is particularly designed for maintaining beer in a calm liquid state by maintaining gas pressure on the beer in a container, for example a beer keg, sufficient to maintain the activating gases in solution in the beer at the temperatures employed and drawing the beer directly from the calm body of liquid in the container through a restricted passage which leads from the point adjacent the bottom of the container to the valve seat of the discharge faucet, said passage being formed to substantially reduce the pressure as the beer flows through the passage and maintain a substantially uniform small volume of flow per unit of length of the passage to prevent agitation and sudden expansion of the beer, whereby the beer is kept in substantially calm liquid condition to the discharge point and the activating gases are substantially maintained in the beer and the beer may be dispensed into a glass without material splashing and without excess foaming. The passage from the container to the discharge faucet consists of a length of tubing, and of course the faucet must be a separate part and separably connected to the tubing for installation purposes.

An object of the present invention is to provide a discharge faucet the passage through which from the point of connection of the faucet to the tube to the discharge seat of the faucet shall continue the reduction in pressure and maintenance of the substantially uniform small volume of flow per unit of length of the passage so that there shall be no agitation or sudden expansion of beer in the faucet.

Another object is to provide a discharge faucet of this character which shall include a novel and improved combination of a shank and a beverage conducting tube whereby tubes of different diameter can be interchangeably mounted in the shank, and a closed air space shall be provided between the tube and the walls of the opening of the shank to insulate the beverage in the tube from atmospheric temperature.

Other objects are to provide a discharge faucet for the purpose described which shall embody a novel and improved construction and combination of a casing and a valve head and wherein the head of the faucet shall be formed to frictionally resist the flow of beer through the faucet and at the same time maintain a minimum agitation or surging of the beverage through the faucet; and to obtain other advantages and results as will be brought out by the following description.

Referring to the the accompanying drawing in which corresponding and like parts are designated throughout the several views by the same reference characters, Figure 1 is a vertical longitudinal sectional view through a discharge faucet embodying my invention, Figure 2 is a similar view showing another form of faucet, and Figure 3 is a transverse sectional view on the line 3—3 of Figure 2.

Specifically describing the illustrated embodiment of the invention, the reference character A designates a portion of the tube containing the passage for conducting beer from a container such as a keg under pressure. As described in my above mentioned patent, this passage is of unusually small and uniform cross sectional area throughout its length or is of uniform volume per unit of length so that the pressure on the beer in the container is substantially reduced and the volume of flow is reduced and maintained uniform throughout the passage. The faucet constituting my present invention is connected to the end of the pipe A for controlling discharge of the beer from the passage.

The faucet generally designated B includes a casing 1 which has a valve chamber 2 therethrough in which is arranged a valve seat 3 with which cooperates a valve head 4 mounted on a slidable stem 5 which is reciprocated within the chamber 2 by a hand lever 6 for opening and closing the valve. The inlet end 7 of the chamber 2 is preferably of the same cross sectional area as the inside of the tube A, and said chamber has a frusto-conical formation which gradually increases in diameter toward the valve seat 3 or the outlet thereof communicating with the discharge spout. The valve head 4 has a conical extension 9 in the correspondingly shaped portion 2 of the valve chamber in such spaced relation thereto that the cross sectional area of the resulting passage 8 formed therebetween when the valve 4 is open is approximately the same as the cross sectional area of the inlet end 7 of the passage 8. As pointed out in my above-mentioned patent, the cross-sectional area of the passage 8 may be about .027 of a square inch corresponding to a diameter of about 1/6 of an inch, for example where the length of the whole passage from the container to the valve seat of the faucet is approximately forty-eight inches and the pressure in the container is about thirty pounds, and with beer at a temperature of about 38 to 45° F. However, the diameter of the passage 8 may be considerably less, for example one-eighth of an inch where the length of the whole passage is much shorter than forty-eight inches, for example about six inches, with the same pressure. The exact length and cross sectional area of the passage is not critical although it is highly important that the passage 8 be of substantially uniform diameter or have a uniform volume per unit of length corresponding to that of the conduit A so as to prevent sudden expansion of the beer in the passage or agitation thereof as might occur during flow of the beer through a passage having different portions of substantially different diameters or volumes per unit of length.

Another form of the faucet is shown in Figure 2 wherein the faucet has an exteriorly threaded shank 12 to be inserted through an opening 13 in the wall 14 of a cabinet. To the end of the shank is separably connected by a union nut 15, a valve casing 16 which has a valve seat 17 with which cooperates a valve head 18 carried by a sliding stem 19 which is actuated by a hand lever 20. The shank 12 has a longitudinal opening 21 in which is removably mounted a tube 23 of substantially smaller diameter, that is, of a diameter to reduce the pressure of the beer and maintain a substantially uniform small volume of flow per unit of length to prevent agitation and sudden expansion of the beer as hereinbefore described. As shown, this tube 23 has one end fitted in a socket 24 in the shank and its other end provided with a head 25 seated in a rabbet 26 in the outer end of the passage 21. The space between the tube 23 and the walls of the opening 21 contains air and therefore serves to insulate the beer in the tube 23 against atmospheric heat.

The head 18 of the valve is arranged to reciprocate in a chamber 27 which communicates at one end with the tube 23 and at the other end with the outlet passage 28. The valve head and the chamber 27 are of such relative sizes that the passage for the beer between the valve head and the walls of the chamber when the valve is opened is of substantially the same cross sectional area as the passage through the tube 23. Also, preferably the valve head has an approximately conical extension 33 corresponding to and for the same purpose as the conical extension 9 of the faucet shown in Figure 1.

The structure and combination of the tube 23 and shank 12 are such that tubes 23 of different diameters can be interchangeably used with the faucet.

In use, it will be understood that a tube or pipe for conducting the beer from a container will be connected to the end of the shank 12 as indicated by dot and dash lines, and the faucet makes it possible to discharge the beer with a minimum of splashing and foaming.

In many instances it is desirable that the amount of foam or "head" on a glass of beer be controllable, and for this purpose I contemplate providing an air inlet passage 30 in the outlet passage 28 of the faucet and control the inlet of air by an adjustable screw valve 31 in the opening having a longitudinal slot 32. When the screw is partially unscrewed from the opening 30, the outer end of the slot is exposed and communicates with the atmosphere so as to permit air to flow into the outlet passage of the faucet and thereby form air bubbles or foam on the beer drawn through the faucet, while when the screw is screwed all the way into the opening 30, the slot is closed by the walls of the opening 30 to prevent flow of air into the outlet passage.

Having thus described my invention, what I claim is:

1. A faucet for dispensing beverages including a casing having a shank formed with an opening with a recess at the bottom of said opening and a rabbet at the outer end thereof, a beverage conducting tube having one end seated in said recess and a head at its other end seated in said rabbet with the intermediate portion of the tube in spaced relation to the walls of the opening in the shank, a passage in said casing communicating with said tube and having a valve seat, and a valve head for cooperating with said seat, and means for operating said valve head.

2. A faucet for dispensing beverages comprising a casing having a valve chamber therein, a valve seat therein, an inlet portion communicating with said valve chamber and having a passage of uniform and continuously high reduction substantially to said chamber to provide throttling means for controlling the flow of beverage, and a valve head wholly within said valve chamber co-operating with said valve seat, said valve chamber and said valve head being dimensionally co-ordinated to provide therebetween in the open position of said valve head a passage extending to said valve seat of a reduction of approximately the same order as that of the throttling passage of said inlet portion.

3. A faucet for dispensing beverages comprising a casing having a valve chamber therein provided with a valve seat and an inlet portion communicating with said chamber and having a passage of substantially uniform cross-section and relatively high constriction continuously to said valve chamber of an order for effectively reducing the pressure of the beverage and providing a small volume of flow into said chamber, and a valve head disposed within said chamber in co-operative relation to said valve seat, said chamber and said valve head being relatively dimensioned to form in the open position of the valve head a passage therebetween providing communication between said inlet portion and said valve seat and maintaining therein a volume of flow approximately the same as that maintained in said inlet portion.

4. A faucet for dispensing beverages including a casing having a valve chamber therein, a valve seat therein, and an inlet portion having a passage of uniformly high reduction extending continuously to said valve chamber, a valve head wholly within said chamber co-operating with said valve seat, said valve chamber and said valve head being shaped and related to provide therebetween in its open position of the valve head a passage having a substantially uniform volume per unit of length from the inlet end thereof to said valve seat of a reduction corresponding to that of said inlet portion, and means for operating said valve head to open and close the valve.

5. A faucet for dispensing beverages including a casing having a valve chamber therein provided with an inlet and a valve seat, said valve chamber having a portion increasing in diameter from said inlet towards said valve seat, a valve head within said valve chamber co-operating with said valve seat and having a conical extension within the correspondingly shaped portion of said chamber in spaced relation thereto to provide a passage between the same, and means directly on the faucet for operating said valve head to open and close the valve.

6. A faucet for dispensing beverages including a casing having a valve chamber therein provided with an inlet and a valve seat, said valve chamber having a portion increasing in diameter from said inlet towards said valve seat, a valve head wholly within said chamber co-operating with said valve seat and having a conical extension on said frusto-conical portion in spaced relation thereto facing the inlet end thereof and providing a passage about the same so as to divide the beverage into a hollow frusto-conical stream thereby to smoothly guide the beverage around the valve head, frictionally resist the flow and thereby reduce the pressure of the beverage, and means for operating said valve head to open and close the valve.

7. A faucet for dispensing beverages including a casing having a valve chamber therein provided with a valve seat and an inlet opening, a tubular shank extending from said casing at the inlet side thereof concentrically with the inlet, and normally having an opening at the outer end thereof, a beverage conducting tube of reduced diameter inserted within said tubular shank, means at the ends of said tube and shank for seating the tube within said shank in spaced relation thereto and in communication with said inlet, a valve head within said valve chamber co-operating with said valve seat, and means for operating said valve head.

8. A faucet for dispensing beverages, such as beer under pressure sufficient to stabilize the activating gases dissolved in the beer which comprises a casing having a valve chamber therein provided with a valve seat at the discharge end thereof and an inlet orifice of substantially reduced cross-sectional area communicating with said valve chamber and a tubular shank projecting from said casing about said inlet at the inlet side thereof, and a tubular member secured within said tubular shank in spaced relation thereto in alignment with said inlet orifice, said tubular member having a uniform cross-sectional area of high reduction for substantially throttling said pressure and producing a substantially small and uniform volume of flow therethrough, a valve head in said chamber co-operating with said valve seat, and means for operating said valve head.

9. A faucet for dispensing carbonated beverages under pressure comprising a casing having a valve chamber therein including a valve seat and an inlet opening of substantially reduced area relative to said chamber, a tubular shank extending rearwardly from said casing concentrically with the axis of said inlet, a beverage conducting tube within said tubular shank in spaced relation thereto in alignment with said inlet, means for seating said tube within said shank in spaced relation thereto and sealing the space at the outer end thereof to form a dead air space between the tube and shank, said tube having a constriction of substantially uniform cross-section of an order exerting a predominant throttling action on the flow to substantially reduce the pressure and produce a small and uniform volume of flow for discharge through said inlet, and a valve head in said chamber co-operating with said valve seat, said chamber and said valve head being relatively dimensioned to form a passage therebetween maintaining a flow therein when the valve head is open approximately the same as that in said throttling tube.

HERMAN H. HARR.